United States Patent
Kokenge

(10) Patent No.: US 9,788,531 B2
(45) Date of Patent: Oct. 17, 2017

(54) MIGRATION BARRIERS, SYSTEMS AND METHODS

(71) Applicant: John Kokenge, Cincinnati, OH (US)

(72) Inventor: John Kokenge, Cincinnati, OH (US)

(73) Assignee: ORGANIZED LIVING INC., Cincinnati, OH (US)

( * ) Notice: Subject to any disclaimer, the term of this patent is extended or adjusted under 35 U.S.C. 154(b) by 1228 days.

(21) Appl. No.: 13/852,106

(22) Filed: Mar. 28, 2013

(65) Prior Publication Data

US 2013/0255587 A1    Oct. 3, 2013

Related U.S. Application Data

(60) Provisional application No. 61/618,921, filed on Apr. 2, 2012.

(51) Int. Cl.

| A01K 3/00 | (2006.01) |
| --- | --- |
| A01K 1/00 | (2006.01) |
| A01K 31/06 | (2006.01) |
| A01K 39/01 | (2006.01) |
| A01K 39/02 | (2006.01) |
| A01K 31/18 | (2006.01) |

(52) U.S. Cl.
CPC ............... *A01K 31/06* (2013.01); *A01K 1/00* (2013.01); *A01K 3/00* (2013.01); *A01K 31/18* (2013.01); *A01K 39/01* (2013.01); *A01K 39/02* (2013.01)

(58) Field of Classification Search
CPC ........ A01K 3/00; A01K 1/0005; A01K 1/035; A01K 1/031; A01K 3/002
See application file for complete search history.

(56) References Cited

U.S. PATENT DOCUMENTS

| 1,214,705 | A | * | 2/1917 | Neely | ............... E04H 17/16 |
| --- | --- | --- | --- | --- | --- |
| | | | | | 256/31 |
| 1,745,588 | A | * | 2/1930 | Shodron | ............... E04B 1/3205 |
| | | | | | 119/436 |
| 1,918,566 | A | * | 7/1933 | Sadleir | ............... A01K 39/0213 |
| | | | | | 119/72.5 |
| 2,626,591 | A | * | 1/1953 | Mazur | ............... A01K 1/00 |
| | | | | | 119/449 |
| 3,017,860 | A | * | 1/1962 | Wilson | ............... A01K 3/00 |
| | | | | | 119/510 |
| 3,208,433 | A | * | 9/1965 | McDermott | ............... A01K 1/0023 |
| | | | | | 119/841 |
| 3,966,172 | A | * | 6/1976 | Garrett | ............... E01F 7/02 |
| | | | | | 256/12.5 |
| 4,077,359 | A | * | 3/1978 | Amurri | ............... A01K 1/00 |
| | | | | | 119/449 |
| 4,299,191 | A | * | 11/1981 | White | ............... A01K 31/005 |
| | | | | | 119/456 |
| 4,375,791 | A | * | 3/1983 | Peppler | ............... A01K 39/01 |
| | | | | | 119/53 |
| 4,449,316 | A | * | 5/1984 | Moorhead | ............... A01M 23/08 |
| | | | | | 256/1 |
| 4,637,345 | A | * | 1/1987 | Hostetler | ............... A01K 39/0213 |
| | | | | | 119/72.5 |

(Continued)

*Primary Examiner* — Leslie A Nicholson, III
*Assistant Examiner* — Kimberley S Wright
(74) *Attorney, Agent, or Firm* — Dinsmore & Shohl LLP

(57) ABSTRACT

A migration barrier includes a first barrier wall and a second barrier wall wherein at least one of the first and second barrier walls together provide a stable base structure that maintains the barrier assembly in an upright, standing position.

14 Claims, 13 Drawing Sheets

(56) References Cited

U.S. PATENT DOCUMENTS

| | | | | |
|---|---|---|---|---|
| 4,669,422 A * | 6/1987 | Steudler, Jr. | ............. | A01K 7/00 119/72 |
| 4,928,633 A * | 5/1990 | Jennings | ................ | A01K 39/02 119/72.5 |
| 4,978,245 A * | 12/1990 | White | ....................... | E01F 9/70 116/63 P |
| 5,039,250 A * | 8/1991 | Janz | ........................... | E01F 7/02 256/12.5 |
| D357,771 S * | 4/1995 | Townsend, III | ............. | 119/903 |
| 5,454,183 A * | 10/1995 | Antonini | ............... | A01M 29/32 43/1 |
| 5,606,830 A * | 3/1997 | Townsend, Jr. | ....... | A01M 29/32 256/11 |
| 6,006,469 A * | 12/1999 | DeMatties | ............. | A01G 13/02 47/23.2 |
| 6,289,848 B1 * | 9/2001 | Estevez | ................ | A01K 1/0005 119/412 |
| 6,705,796 B2 * | 3/2004 | Lund | ....................... | E01F 9/688 116/63 P |
| 7,497,187 B2 * | 3/2009 | Ingley, III | .............. | A01K 1/031 119/417 |
| 7,568,449 B2 * | 8/2009 | Hirokawa | ............ | A01K 1/0005 119/452 |
| 7,753,001 B2 * | 7/2010 | Hung | ..................... | A01K 39/01 119/61.3 |
| 7,954,456 B2 * | 6/2011 | Hirokawa | ............ | A01K 1/0005 119/452 |
| 8,074,607 B2 * | 12/2011 | Campbell | ............ | A01K 1/0011 119/523 |
| 8,141,517 B2 * | 3/2012 | Shimoda | ................ | A01K 1/034 119/473 |
| 8,230,816 B2 * | 7/2012 | Hirokawa | ............ | A01K 1/0005 119/452 |
| 8,596,930 B2 * | 12/2013 | Woudenberg | ......... | E02D 17/202 405/302.6 |
| 8,627,603 B2 * | 1/2014 | Flannery | ................... | E06B 7/32 49/465 |
| 8,683,950 B2 * | 4/2014 | Hung | ..................... | A01K 39/01 119/52.3 |
| 8,833,305 B2 * | 9/2014 | Macpherson | ........ | A01K 5/0142 119/61.5 |
| 9,119,381 B2 * | 9/2015 | Gingerich | ............. | A01K 1/0005 |
| 2003/0099511 A1 * | 5/2003 | Lund | ....................... | E01F 9/688 404/6 |
| 2006/0107901 A1 * | 5/2006 | Hirokawa | ............ | A01K 1/0005 119/452 |
| 2008/0072839 A1 * | 3/2008 | Campbell | ............ | A01K 1/0011 119/525 |
| 2008/0134984 A1 * | 6/2008 | Conger | ................. | A01K 1/031 119/417 |
| 2009/0114160 A1 * | 5/2009 | Hung | ..................... | A01K 39/01 119/61.3 |
| 2011/0114910 A1 * | 5/2011 | Stuckel | ................... | E04H 17/10 256/24 |
| 2011/0198549 A1 * | 8/2011 | Hirokawa | ............ | A01K 1/0005 256/24 |
| 2013/0269619 A1 * | 10/2013 | Hung | ..................... | A01K 39/01 119/52.4 |
| 2014/0230742 A1 * | 8/2014 | Gingerich | ............ | A01K 1/0005 119/416 |
| 2014/0331939 A1 * | 11/2014 | Gingerich | ..................... | 119/416 |

* cited by examiner

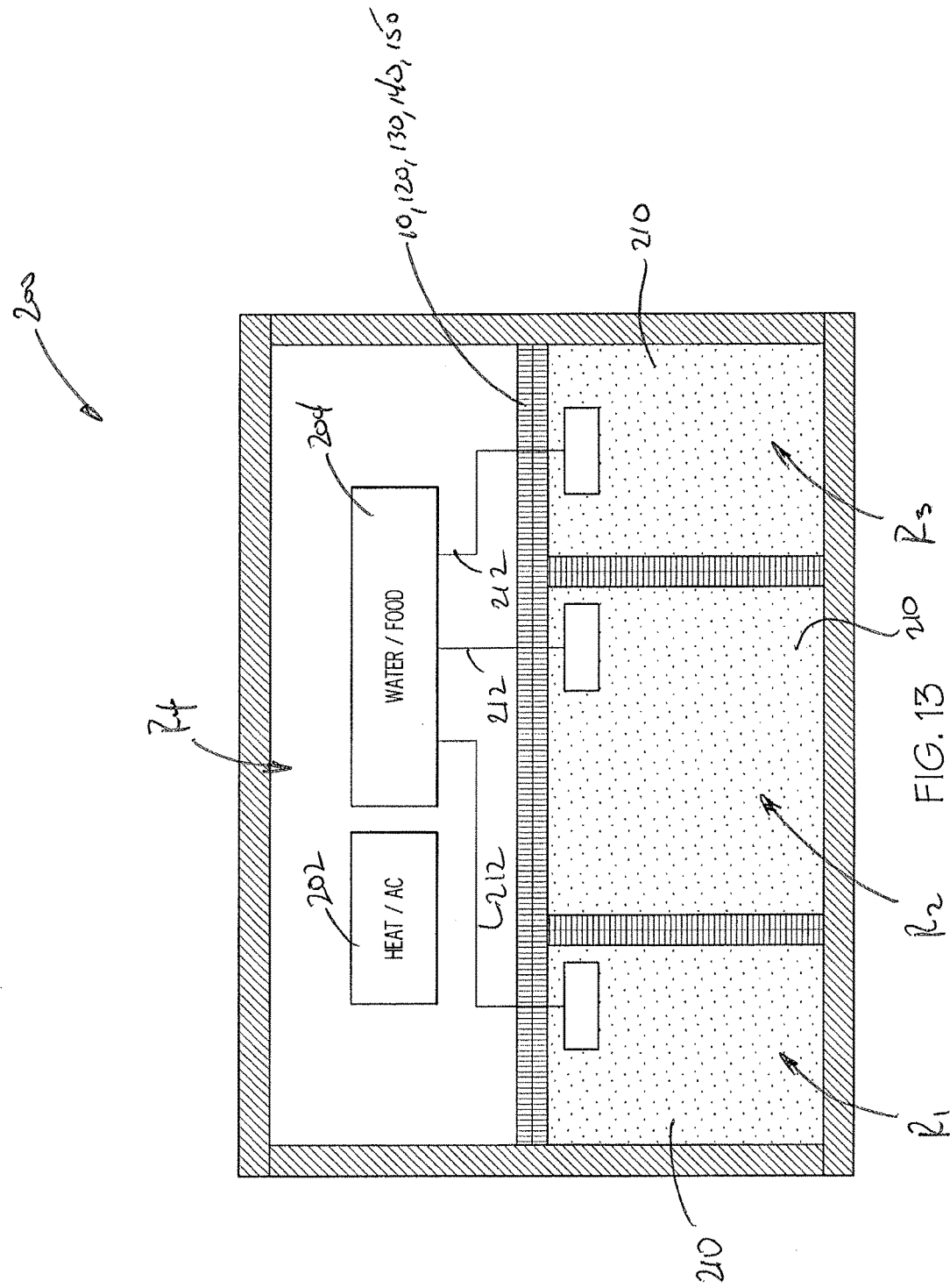

MIGRATION BARRIERS, SYSTEMS AND METHODS

CROSS-REFERENCE TO RELATED APPLICATIONS

This application claims the benefit of priority under 35 U.S.C. §119 to U.S. Provisional Patent Application Ser. No. 61/618,921, filed Apr. 2, 2012, the details of which are incorporated by reference in their entirety.

TECHNICAL FIELD

The present application relates to migration barriers and, more particularly, to migration barriers for providing spacing of animal groups.

BACKGROUND

Coops are frequently provided for animals, such as chickens or other birds, to provide housing for the animals. It may be desirable to provide spacing between groups of the animals within the coops and to inhibit migration of the animals into relatively large clusters. For example, a heat source or a food source within the coops may entice the animals to form large groups around such sources. Pressurized air being blown toward the animals for ventilation may cause them to gather and avoid the pressurized air. Fences are commonly used for separating groups of animals or for preventing the migration of animals into a fenced in space.

SUMMARY

In one embodiment, a migration barrier includes a first barrier wall and a second barrier wall wherein at least one of the first and second barrier walls together provide a stable base structure that maintains the barrier assembly in an upright, standing position.

In another embodiment, a method of providing a migration barrier system for a plurality of birds is provided. The method includes locating a first migration barrier on a support surface for the plurality of birds. The first migration barrier including a first barrier wall extending upwardly from the support surface at an angle to vertical and a second barrier wall extending upwardly from the support surface at an angle to vertical. The first and second barrier walls of the first migration barrier each meet at a respective top end of the first and second barrier walls of the first migration barrier. The first migration barrier has a base structure that supports the first migration barrier on the support surface in an upright, standing position. A second migration barrier is located on the support surface and adjacent the first migration barrier such that a region of overlap is provided where the second migration barrier is stacked on the first migration barrier. The second migration barrier includes a first barrier wall extending upwardly from the support surface at an angle to vertical and a second barrier wall extending upwardly from the support surface at an angle to vertical. The first and second barrier walls of the second migration barrier each meet at a respective top end of the first and second barrier walls of the second migration barrier. The second migration barrier has a base structure that supports the second migration barrier on the support surface in an upright, standing position.

In another embodiment, a migration barrier includes a first barrier wall including a bottom end and a top end. A second barrier wall includes a bottom end and a top end. The second barrier wall is connected to the first barrier wall at the top ends of the first and second barrier walls. The second barrier wall is angled relative to the first barrier wall such that the bottom ends of the first barrier wall and the second barrier wall together provide a base structure that supports the migration barrier on a support surface in an upright, standing position.

In another embodiment, a migration barrier system includes a first migration barrier including a first barrier wall including a bottom end and a top end. A second barrier wall includes a bottom end and a top end. The second barrier wall is connected to the first barrier wall at the top ends of the first and second barrier walls. The second barrier wall is angled relative to the first barrier wall such that the bottom ends of the first barrier wall and the second barrier wall together provide a base structure that supports the first migration barrier on a support surface in an upright, standing position. A second migration barrier is stacked on the first migration barrier forming a region of overlap. The second migration barrier includes a first barrier wall including a bottom end and a top end. A second barrier wall includes a bottom end and a top end. The second barrier wall is connected to the first barrier wall at the top ends of the first and second barrier walls. The second barrier wall is angled relative to the first barrier wall such that the bottom ends of the first barrier wall and the second barrier wall together provide a base structure that supports the second migration barrier on a support surface.

The details of one or more embodiments are set forth in the accompanying drawings and the description below. Other features, objects, and advantages will be apparent from the description and drawings.

BRIEF DESCRIPTION OF THE DRAWINGS

FIG. 13 is an elevated view of a migration barrier system according to one or more embodiments described herein.

DETAILED DESCRIPTION

Embodiments described herein generally relate to migration barriers that provide spacing between groups of animals, such as birds or other animals. As one example, the animals may be farm birds and/or game birds, such as chicken, quail, turkey and pheasant. The migration barriers may include one or more barrier walls that stand on the ground at an angle to vertical. The migration barriers may be stacked, abutted and/or placed side-by-side to form sections or zones for holding a predetermined number of animals and controlling migration of the animals out of the zones.

Figure 1:
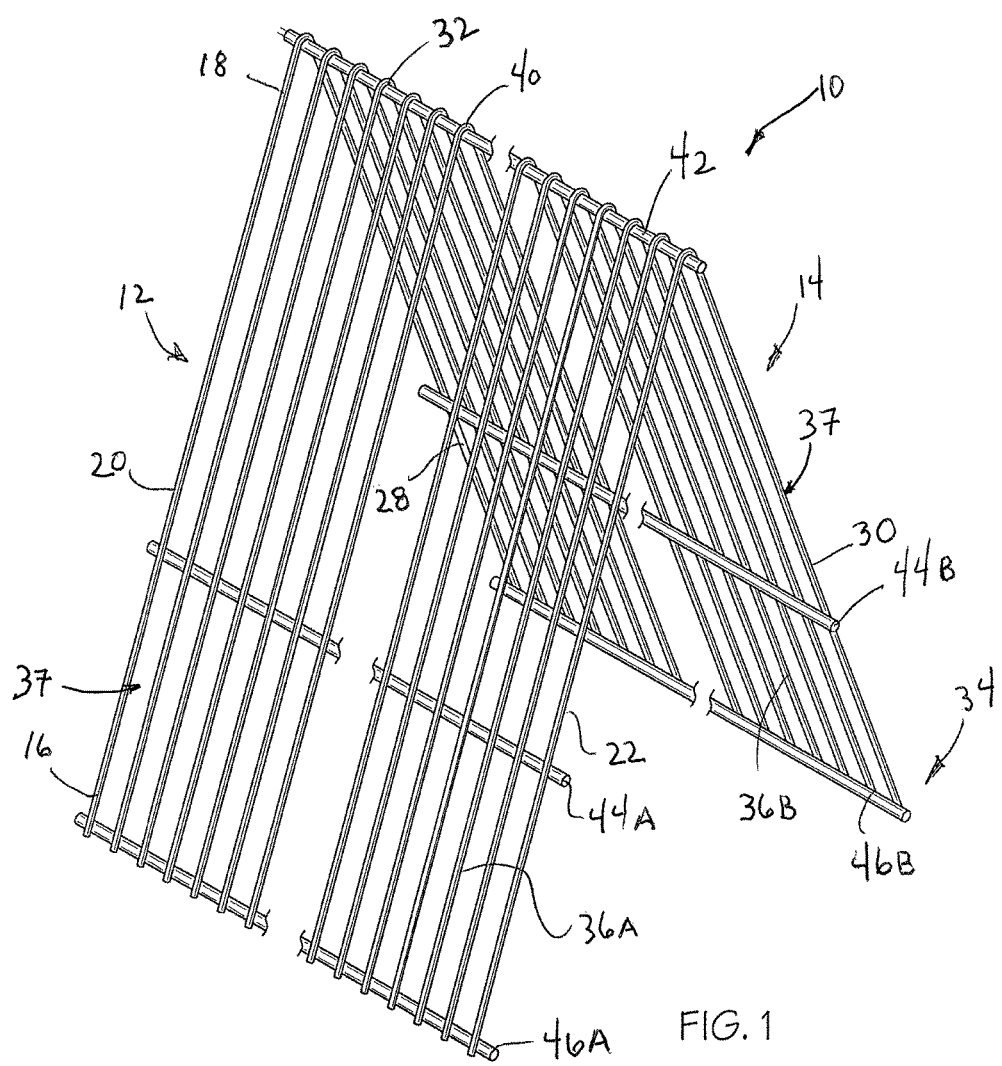
FIG. 1 is a perspective view of a migration barrier according to one or more embodiments described herein.
Figure 2:
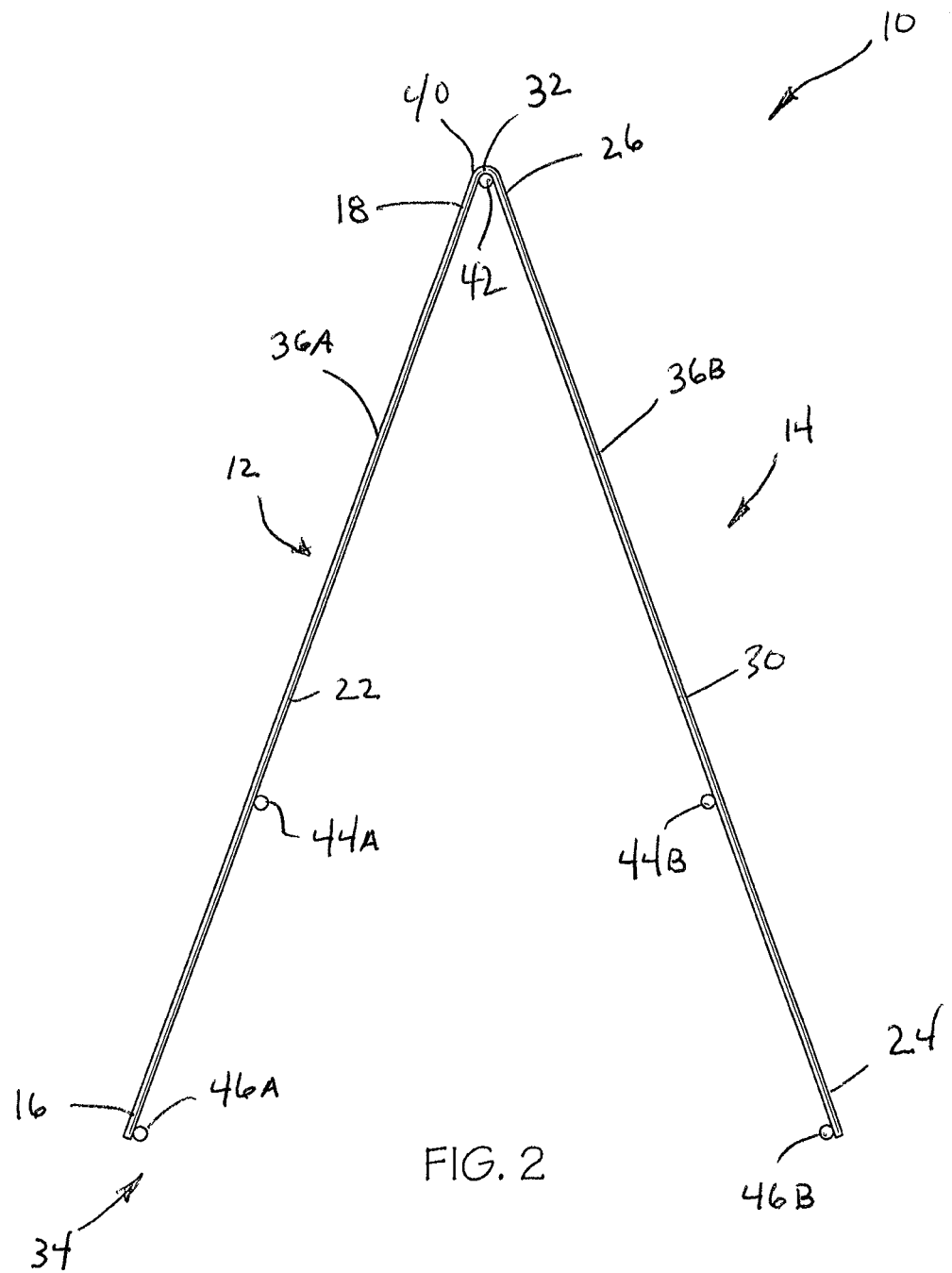
FIG. 2 is a side view of the migration barrier of FIG. 1.

Referring to FIGS. 1 and 2, a migration barrier 10 includes a first barrier wall 12 and a second barrier wall 14. The first barrier wall 12 includes a bottom end 16, a top end 18 and sides 20 and 22 that extend between the bottom end 16 and the top end 18. The second barrier wall 14 also includes a bottom end 24, a top end 26 and sides 28 and 30 that extend between the bottom end 24 and the top end 26.

The first barrier wall 12 extends from a support surface (e.g., the ground, floor, shelving, etc.) upwardly to the top end 18. Likewise, the second barrier wall 14 extends from the support surface upwardly to the top end 26. In the illustrated embodiment, the top ends 18 and 26 meet at a somewhat rounded peak 32 or apex (e.g., an apex of between about 20 and 60 degrees, such as about 40 degrees) forming a somewhat triangular cross-sectional shape having a base structure 34 formed by the bottom ends 16 and 24 and a closed top formed by the rounded peak 32.

The first barrier wall 12 and the second barrier wall 14 may be formed using a plurality of bars 36 having a first bar segment 36A associated with the first barrier wall 12 and a second bar segment 36B associated with the second barrier wall 14. The first bar segments 36A may extend from the bottom end 16 upwardly to the top end 18 and the second bar segments 36B may extend from the bottom end 24 to the top end 26. The first bar segments 36A and the second bar segments 36B may be connected at bends 40 formed in the bars 36.

Some or all of the first bar segments 36A and the second bar segments 36B may be substantially parallel and spaced apart from each other along a length of the migration barrier 10. Spacing the bar segments 36A and 36B provide multiple openings 37 that can be used for ventilation by allowing air to pass through the first barrier wall 12 and the second barrier wall 14. In some embodiments, the first bar segments 36A and/or the second bar segments 36B may be spaced apart the same interval along the length of the migration barrier 10. In other embodiments, the first bar segments 36A and/or the second bar segments 36B may be spaced apart at different intervals along the length of the migration barrier 10. While the first and second bar segments 36A and 36B extend continuously from the bottom ends 16 and 24 to the top ends 18 and 26, in other embodiments, the first and second bar segments 36A and/or 36B may have gaps or terminate along the heights of the first barrier wall 12 and the second barrier wall 14. Additionally, while the first and second bar segments 36A and 36B may be straight, as shown, other aesthetic designs may be used, such as twisted bars, wavy or zigzag shaped bars, etc. Plates or other barriers may be used instead of the illustrated bar segments 36A and 36B. Further, while relatively narrow round bar segments 36A and 36B are shown, thicker and/or rectangular or other shaped bar segments may be used.

The migration barrier 10 may further include longitudinal support bars 42, 44 and 46. Support bar 42 may be a top support about which the plurality of bars 36 are bent, thereby interconnecting the plurality of bars 36 together at their bends 40. Support bars 44A and 44B may be intermediate support bars that are located between the support bar 42 and the respective support bars 46A and 46B. Support bar 44A may be associated with the first barrier wall 12, interconnecting the plurality of bar segments 36A at a location spaced between the top and bottom ends 18 and 16. Support bar 44B may be associated with the second barrier wall 14, interconnecting the plurality of bar segments 36B at a location spaced between the top and bottom ends 26 and 24. Support bars 46A and 46B may be lower support bars that are located at or near the bottom ends 16 and 24, respectively. Support bar 46A may be associated with the first barrier wall 12, interconnecting the plurality of bar segments 36 at or near the bottom end 16. Support bar 46B may be associated with the second barrier wall 14, interconnecting the plurality of bar segments 36 at or near the bottom end 24. The support bars 42, 44 and 46 may all be generally parallel to each other and straight. In other embodiments, the support bars 42, 44 and/or may not be parallel.

In some embodiments, the support bars 46A and 46B may contact the support surface thereby providing additional contact area forming the base structure 34. In other embodiments, the support bars 46A and 46B may be spaced from the bottom ends 16 and 24 and the support surface. While the support bars 42, 44 and 46 extend continuously between outer sides 20 and 22, 28 and 30 of the migration barrier 10, in other embodiments, the support bars 42, 44 and 46 may have gaps or terminate along the lengths of the first barrier wall 12 and the second barrier wall 14. Additionally, while the support bars 42, 44 and 46 may be straight, as shown, other aesthetic designs may be used, such as twisted bars, wavy or zigzag shaped bars, etc. Plates or other barriers may be used instead of the illustrated support bars 42, 44 and 46. Further, while relatively narrow round support bars 42, 44 and 46 are shown, thicker and/or rectangular or other shaped bar may be used.

The migration barrier 10 may be formed of any suitable materials and using any suitable methods. For example, the various bars forming the migration barrier may be formed of metals and/or plastics using any one of forging, molding, machining, bending, etc. The bars may be interconnected using any suitable process, such as welding, adhesives and the like.

Figure 3:
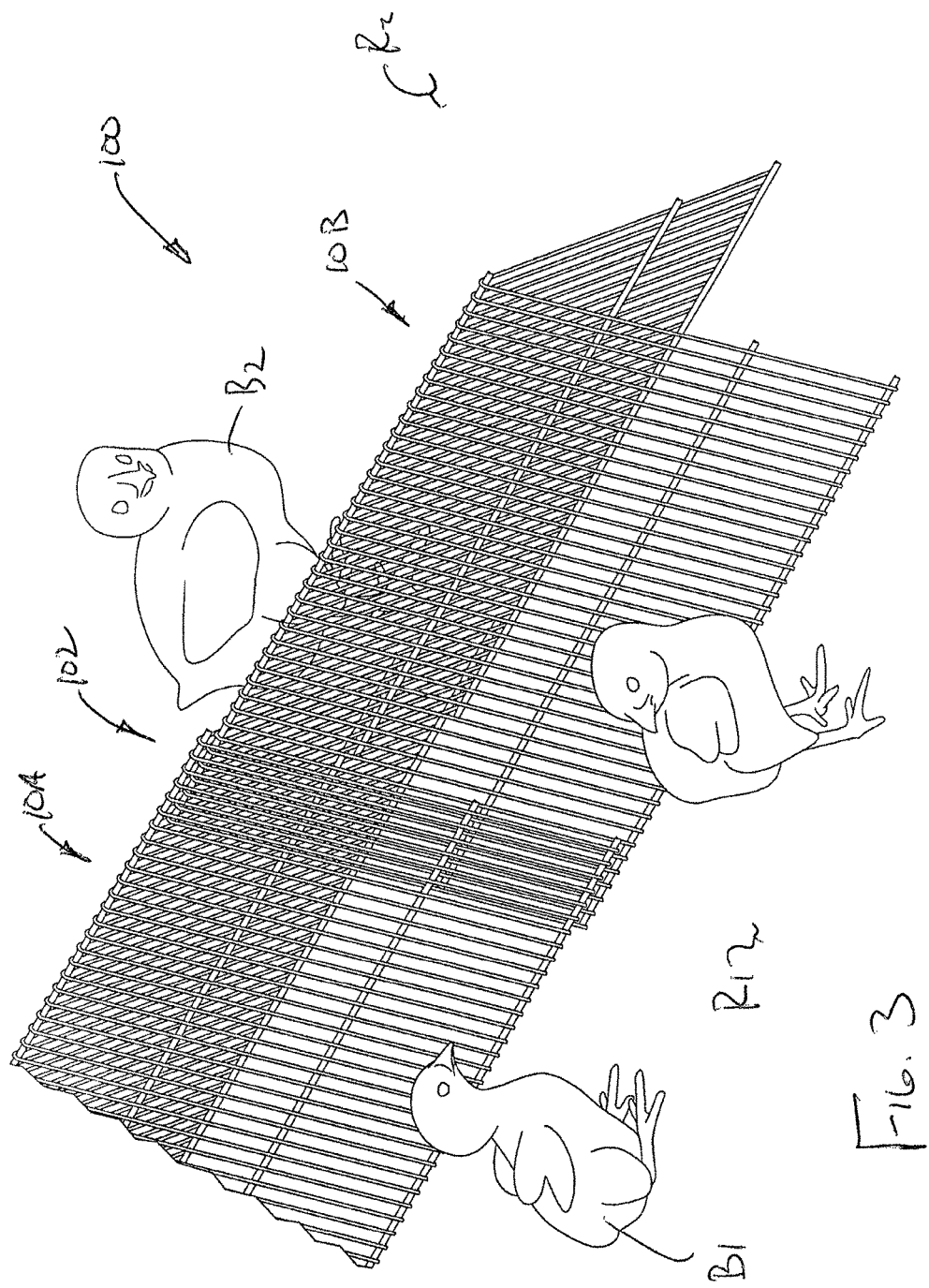
FIG. 3 illustrates a migration barrier system using the migration barrier of FIG. 1 according to one or more embodiments described herein.

Referring to FIG. 3, a migration barrier system 100 is illustrated using the migration barriers 10A and 10B. The migration barrier system 100 may be provided in an indoor and/or an outdoor coop. In the illustrated embodiment, the migration barrier 10A is at least partially stacked or nested upon the migration barrier 10B, thereby forming an overlap region 102 where the migration barriers 10A and 10B are nested. The migration barriers 10A and 10B form a migration barrier assembly 102 that provides a continuous barrier between region R1 containing birds B1 and region R2 containing birds B2. In some embodiments, a height of the migration barriers 10A and 10B is at least 50 percent of a height of the birds B1 and B2, such as taller than the birds B1 and B2. In some embodiments, a height of the migration barriers 10A and 10B may be no greater than 16 inches, such as no greater than 11 inches. The length of the migration barriers 10A and 10B may be, for example, 10 and/or 12 feet. The first and second barrier walls 12 and 14 may be situated at an angle to vertical, thereby providing the triangular shape. For example, the first and second barrier walls 12 and 14 may be at least about 10 degrees, such as at least about 15 degrees, such as at least about 19.5 degrees from vertical, but no greater than about 45 degrees, such as between about 10 degrees and about 25 degrees from vertical.

Figure 4:
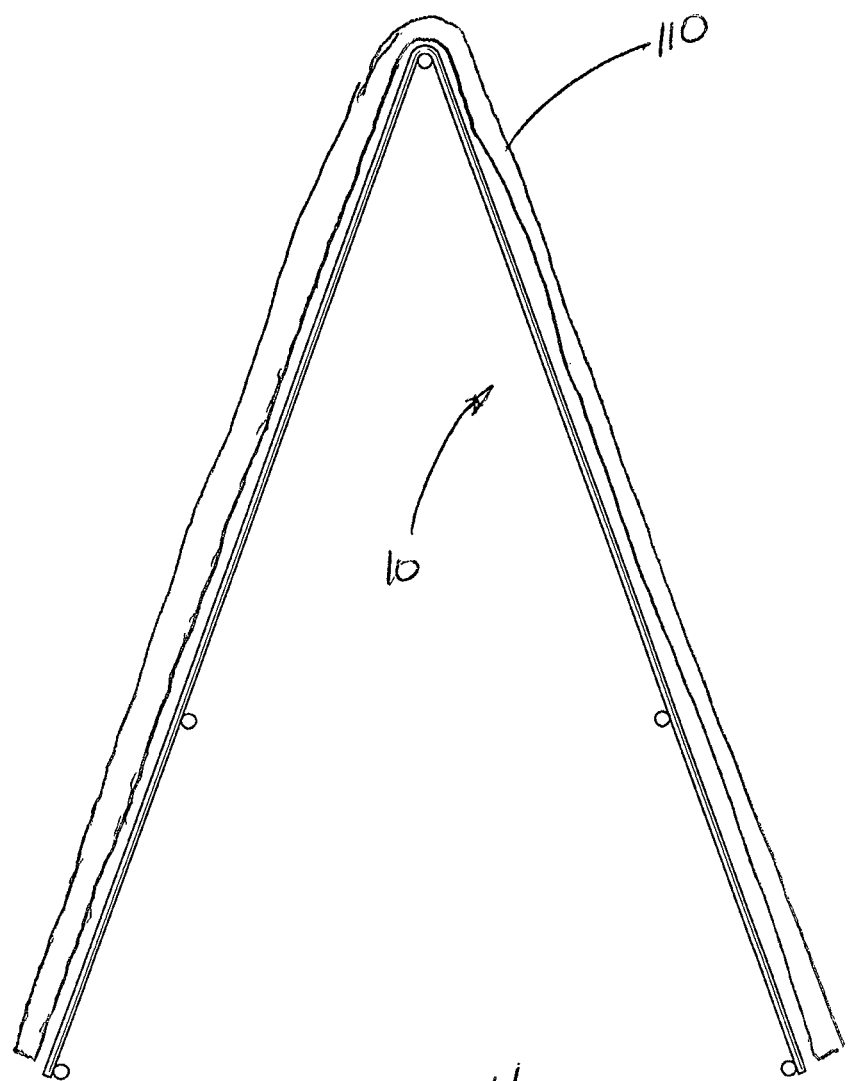
FIG. 4 is a side view of the migration barrier of FIGS. 1 and 2 including a cover according to one or more embodiments described herein.

Referring now to FIG. 4, a cover 110 may be provided for covering an exterior region of the migration barrier 10. The cover 110 may be, for example, a continuous sheet of material (e.g., plastic, fabric or metal) that is used to cover one or both of the barrier walls 12 and 14. The cover 110 may be removable and may be connectable to the migration barrier 10 using, for example, ties or other fasteners.

Figure 5:
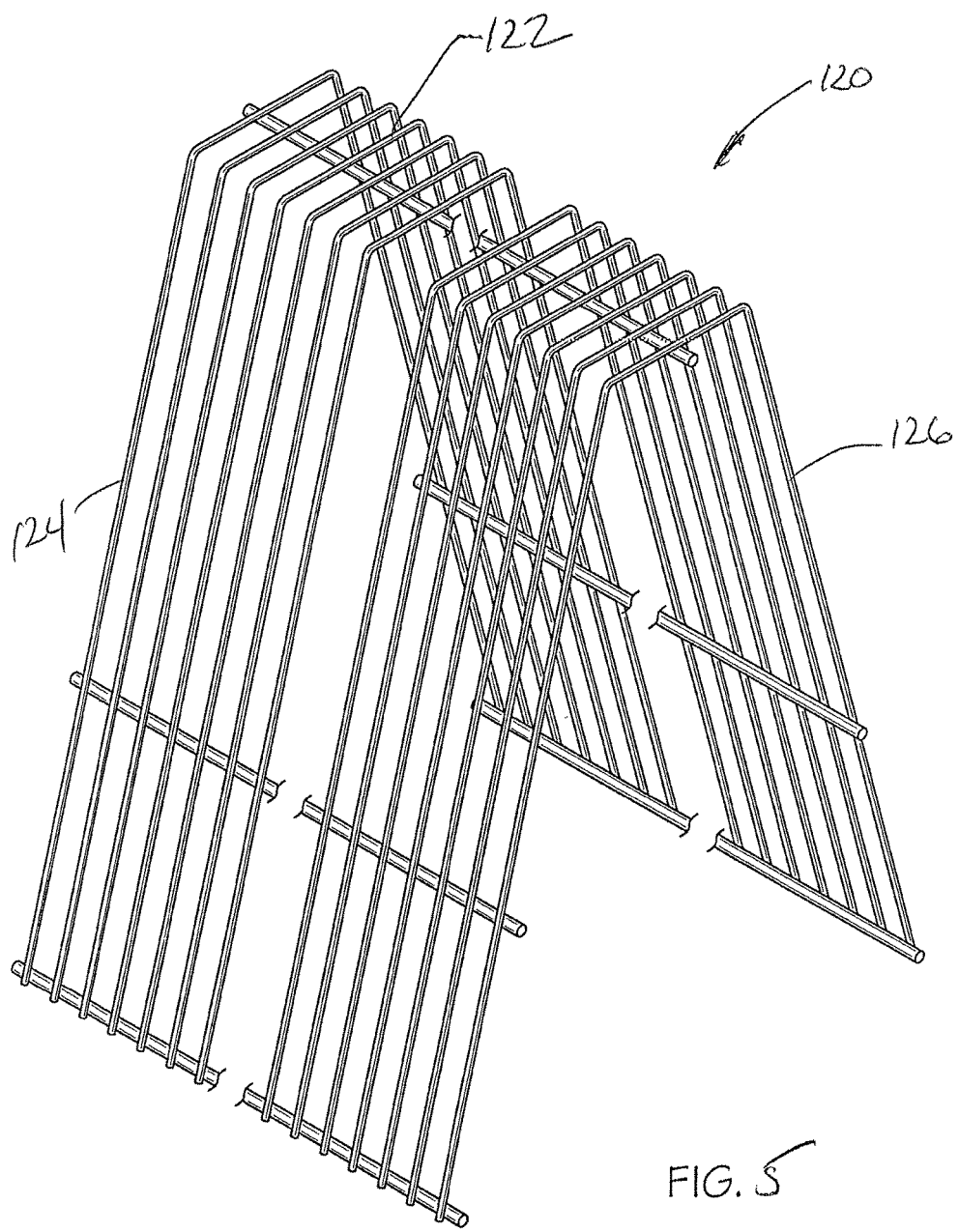
FIG. 5 is a perspective view of another migration barrier according to one or more embodiments described herein.
Figure 6:
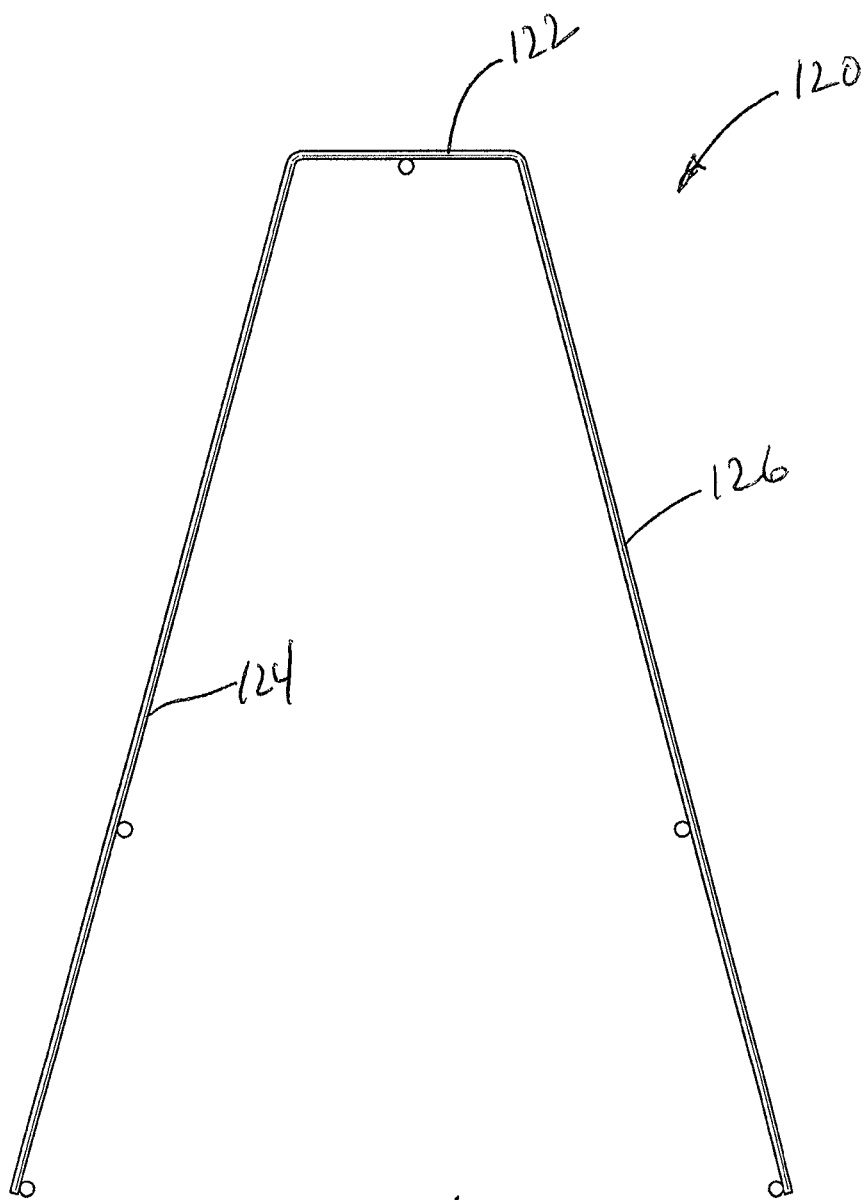
FIG. 6 is a side view of the migration barrier of FIG. 5.

Referring now to FIGS. 5 and 6, another embodiment of a migration barrier 120 is illustrated that includes many of the features described above. In this embodiment, a top, somewhat planar wall 122 is provided between straight barrier walls 124 and 126, thereby providing a somewhat truncated triangular shape.

Figure 7:
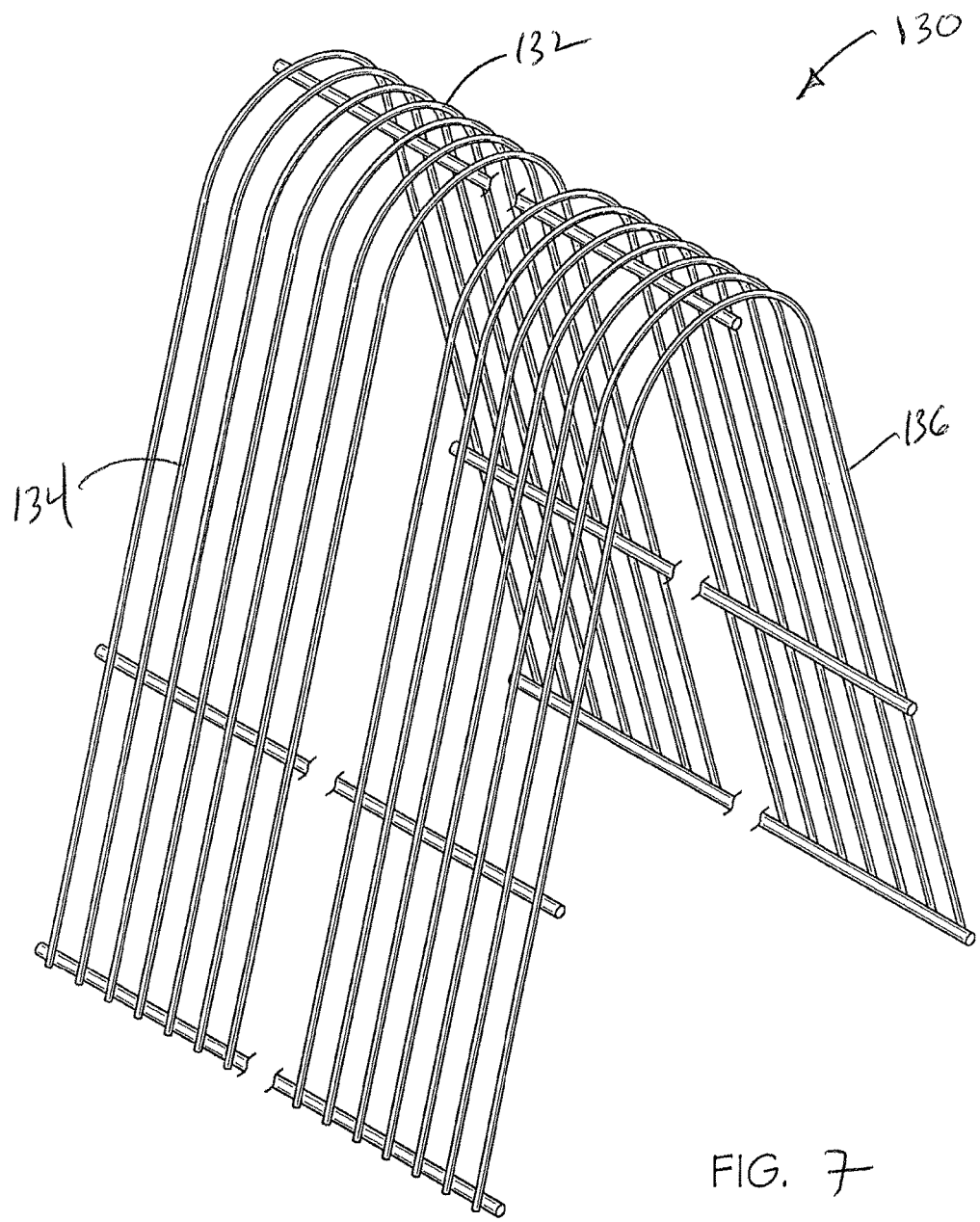
FIG. 7 is a perspective view of another migration barrier according to one or more embodiments described herein.
Figure 8:
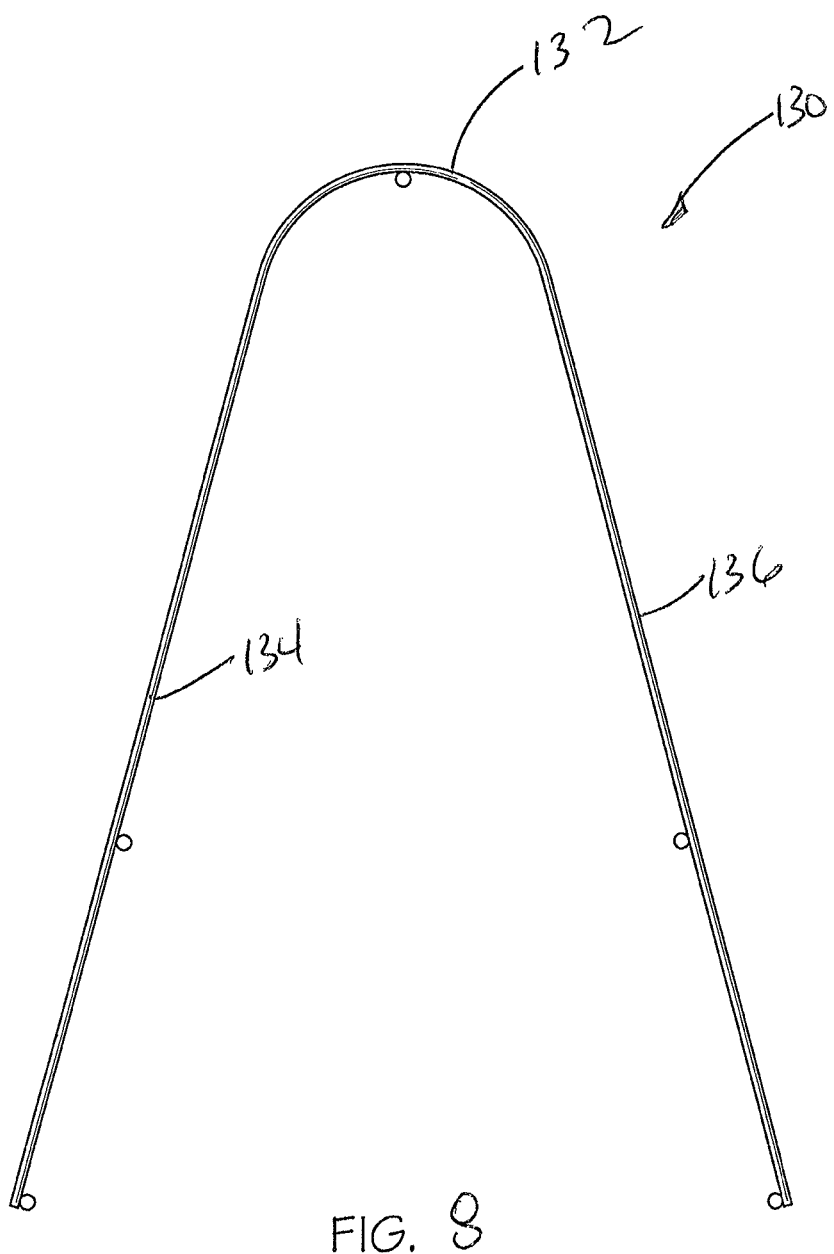
FIG. 8 is a side view of the migration barrier of FIG. 7.

Referring to FIGS. 7 and 8, another embodiment of a migration barrier 130 is illustrated that includes many of the features described above. In this embodiment, a top, somewhat rounded wall 132 is provided between straight barrier walls 134 and 136.

Figure 9:
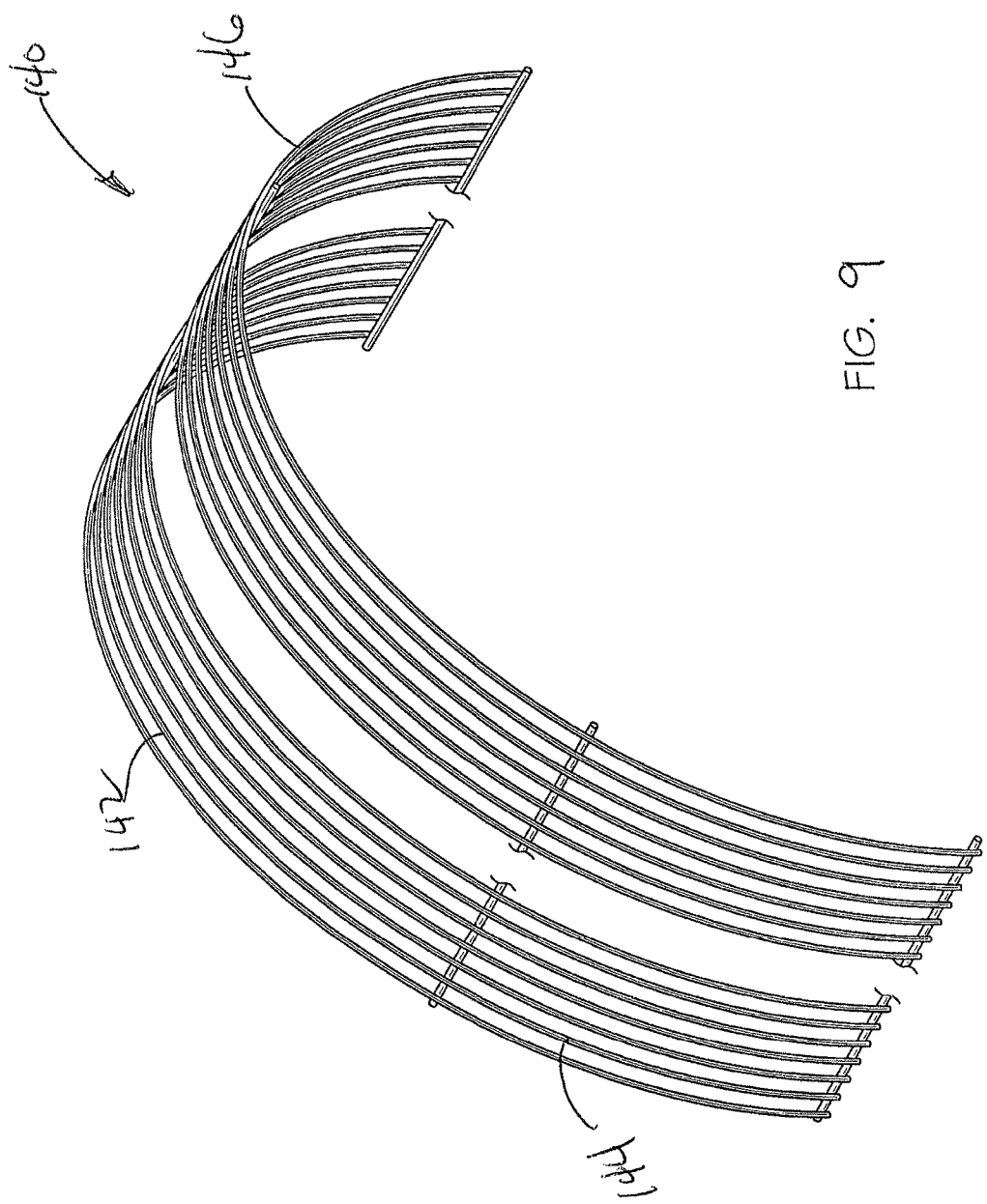
FIG. 9 is a perspective view of another migration barrier according to one or more embodiments described herein.
Figure 10:
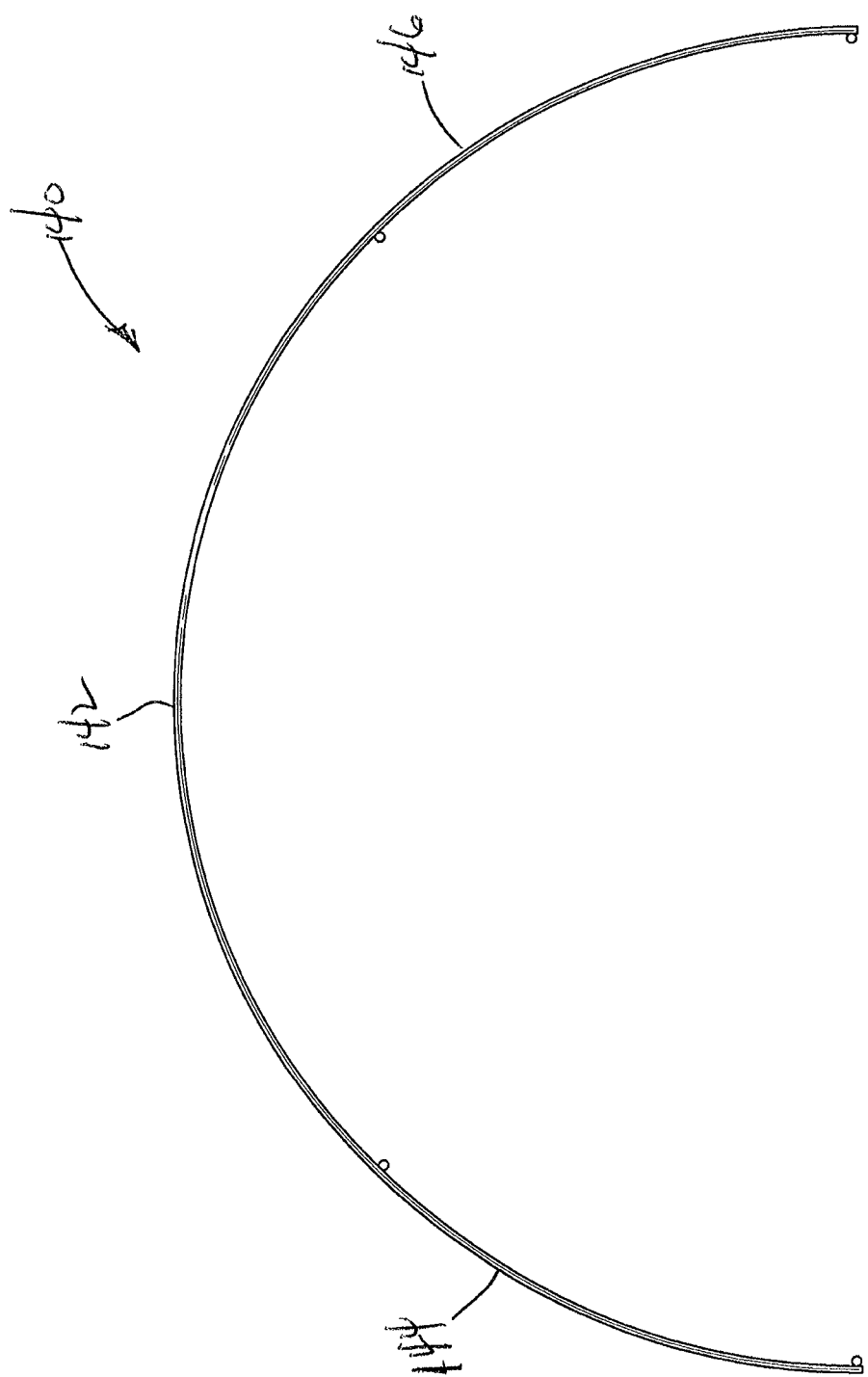
FIG. 10 is a side view of the migration barrier of FIG. 9.

Referring to FIGS. 9 and 10, another embodiment of a migration barrier 140 is illustrated that includes many of the features described above. In this embodiment, a continuous round arch forms a top 142 and barrier walls 144 and 146.

Figure 11:
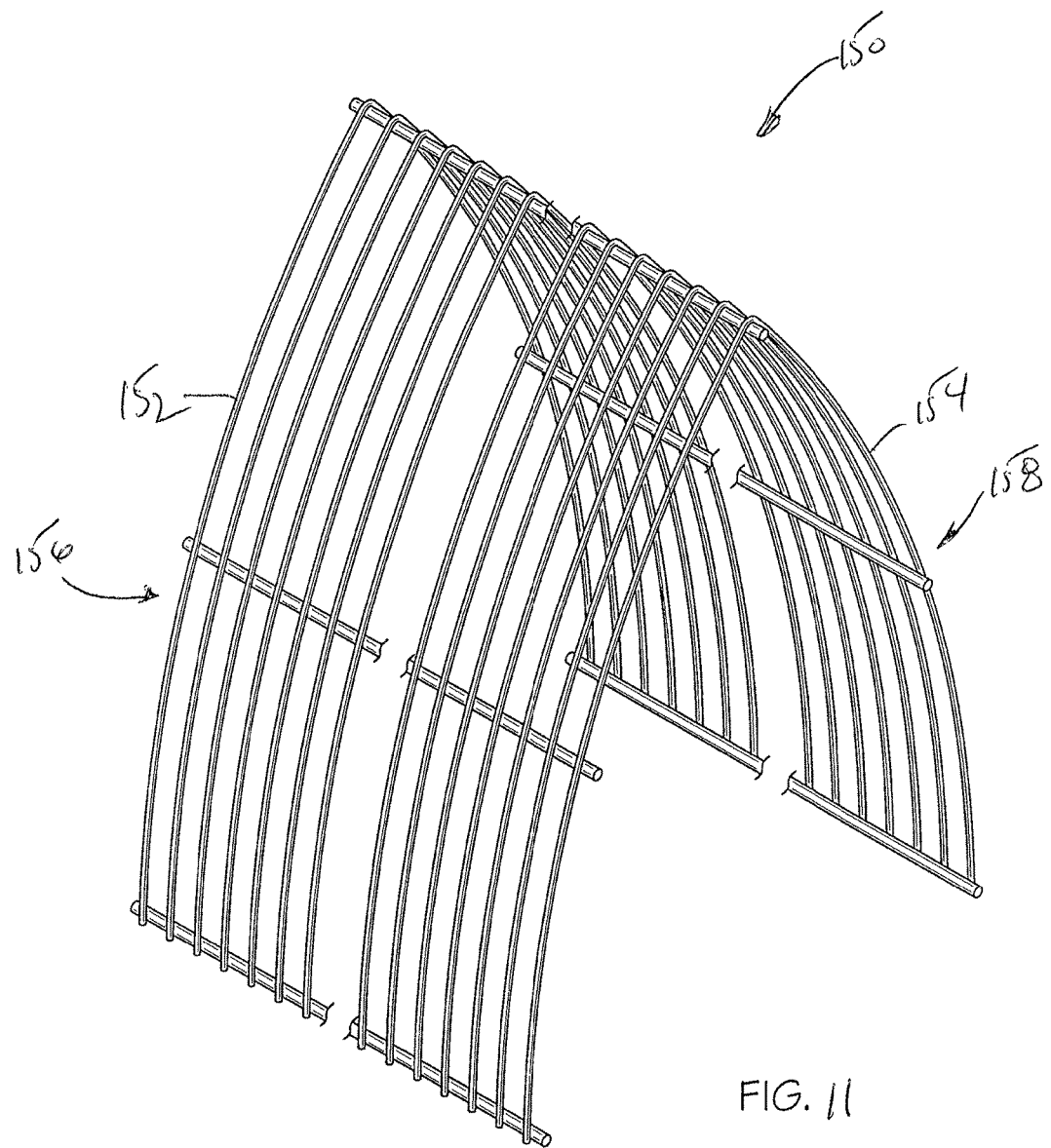
FIG. 11 is a perspective view of another migration barrier according to one or more embodiments described herein.
Figure 12:
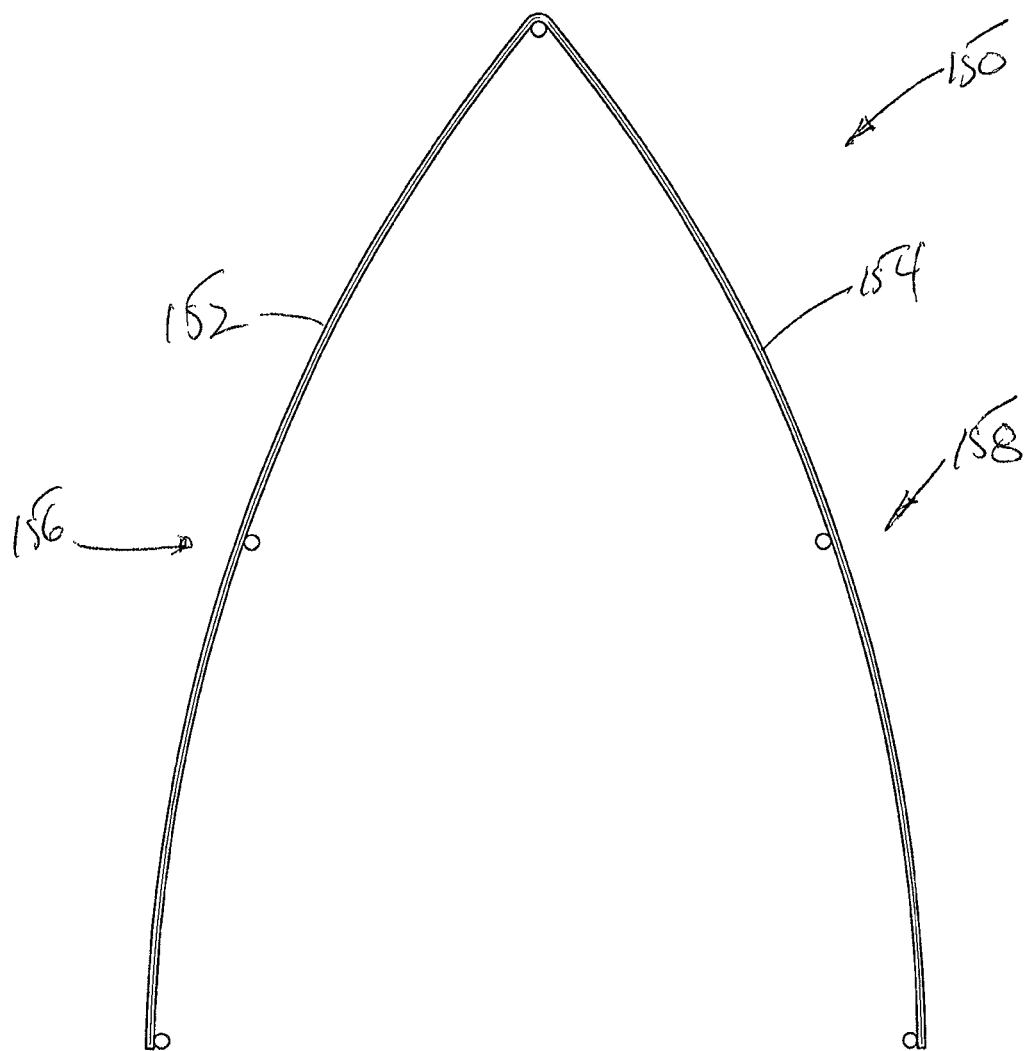
FIG. 12 is a side view of the migration barrier of FIG. 11.

Referring to FIGS. 11 and 12, another embodiment of a migration barrier 150 is illustrated and includes many of the features described above. In this embodiment, barrier walls 152 and 154 are not straight and planar, but instead have rounded portions 156 and 158 that protrude outwardly away from each other. In other embodiments, the rounded portions 156 and 158 may protrude toward each other.

Referring to FIG. 13, a migration barrier system 200 may include any one or more of the migration barriers 10, 120, 130, 140 and 150 described above that are overlapped and placed side by side to provide a primary holding region Rp. The primary holding region Rp may be formed of a perimeter wall (e.g., of a coop). The primary holding region Rp may be subdivided into secondary holding regions R1, R2 and R3, each holding a plurality of animals 210. A fourth region R4 may be provided where a heat source 202 and a food/water source 204 are located. As can be seen, the migration barriers 10, 120, 130, 140 and/or 150 may be used to divide the secondary holding regions R1, R2 and R3 from the region R4. Such an arrangement can inhibit animals 210, such as chickens, from entering the region R4 and bunching around the heat source 202 and the food/water source 203. The birds may also move together to move away from circulation fans that bring in air from the outside. This can allow for a more even distribution of heat/AC and food/water to each of the holding regions R1, R2 and R3. Food and water lines 212 may be provided that can pass through the migration barriers 10, 120, 130, 140 and/or 150 and into the holding regions R1, R2 and R3.

The above-described migration barriers can be stacked side-by-side to provide a migration barrier assembly that interlocks together with no additional hardware. The migration barriers may be stacked, one on top of the other for ease in stacking, storage, cleaning and handling. The shapes of the migration barriers provides a stable base that holds the migration barriers in their upright standing positions without use of any additional stands. The migration barriers may be modified at location or elsewhere, for example, by removing bars, to allow for insertion of feed and water lines that pass through the migration barriers. The migration barriers may include an epoxy coating that resists environmental conditions. The migration barriers may be formed using animal friendly materials. Use of the spaced bars may provided for added ventilation, minimize dead air spots while providing an ornamentally pleasing design.

It is to be clearly understood that the above description is intended by way of illustration and example only and is not intended to be taken by way of limitation, and that changes and modifications are possible.

What is claimed is:

1. A method of providing a migration barrier system for a plurality of birds, the method comprising:
    locating a first migration barrier on a support surface for the plurality of birds, the first migration barrier including a first barrier wall extending upwardly from the support surface at an angle to vertical and a second barrier wall extending upwardly from the support surface at an angle to vertical, the first and second barrier walls of the first migration barrier each meeting at a respective top end of the first and second barrier walls of the first migration barrier, the first migration barrier having a base structure that supports the first migration barrier on the support surface in an upright, standing position;
    locating a second migration barrier on the support surface and adjacent the first migration barrier such that a region of overlap is provided where the second migration barrier is stacked on the first migration barrier, the second migration barrier including a first barrier wall extending upwardly from the support surface at an angle to vertical and a second barrier wall extending upwardly from the support surface at an angle to vertical, the first and second barrier walls of the second migration barrier each meeting at a respective top end of the first and second barrier walls of the second migration barrier, the second migration barrier having a base structure that supports the second migration barrier on the support surface in an upright, standing position; and
    inserting one or both of a food line and a water line through one or both of the first migration barrier and the second migration barrier providing access to one or both of food and water to the plurality of birds.

2. The method of claim 1 further comprising forming multiple, individual holding regions for the plurality of birds using the first and second migration barriers and a plurality of other migration barriers where the plurality of other migration barriers each include a first barrier wall extending upwardly from the support surface at an angle to vertical and a second barrier wall extending upwardly from the support surface at an angle to vertical, each of the plurality of other migration barriers including the first and second barrier walls meeting at a respective top end, the plurality of other migration barriers each having a base structure that supports its respective migration barrier on the support surface in an upright, standing position.

3. The method of claim 2 further comprising stacking adjacent ones of the plurality of other migrations barriers forming regions of overlap.

4. The method of claim 1, wherein the first migration barrier includes the first barrier wall comprising a plurality of bars extending between a bottom end and the top end and spaced-apart in a lengthwise direction of the first barrier wall of the first migration barrier.

5. The method of claim 4 modifying the first migration barrier in situ by one or both of deforming and removing one or more of the plurality of bars.

6. The method of claim 1 further comprising covering one or both of the first and second migration barriers with a cover.

7. A migration barrier system comprising:
    a first migration barrier comprising:
        a first barrier wall including a bottom end and a top end; and
        a second barrier wall including a bottom end and a top end, the second barrier wall being connected to the first barrier wall at the top ends of the first and second barrier walls, the second barrier wall being angled relative to the first barrier wall such that the bottom ends of the first barrier wall and the second barrier wall together provide a base structure that supports the first migration barrier on a support surface in an upright, standing position; and a second migration barrier stacked on the first migration barrier forming a region of overlap, the second migration barrier comprising:

a first barrier wall including a bottom end and a top end; and a second barrier wall including a bottom end and a top end, the second barrier wall being connected to the first barrier wall at the top ends of the first and second barrier walls, the second barrier wall being angled relative to the first barrier wall such that the bottom ends of the first barrier wall and the second barrier wall together provide a base structure that supports the second migration barrier on a support surface;

wherein one or both of the first migration barrier and the second migration barrier is configured to allow for insertion of one or both of a food line and a water line therethrough;

wherein the first barrier walls of both the first migration barrier and the second migration barrier each comprises a plurality of bars that extend between the respective bottom end and the respective top end of each first barrier wall.

8. The migration barrier system of claim 7, wherein a plurality of bars of both of the first migration barrier and second migration barrier are spaced apart from each other along a length of the respective first barrier walls.

9. The migration barrier system of claim 8, wherein the plurality of bars of both of the first migration barrier and second migration barrier each have a first bar segment associated with the respective first barrier walls and a second bar segment associated with the respective second barrier walls.

10. The migration barrier system of claim 7, wherein the first migration barrier and the second migration barrier have a height of no more than 11 inches.

11. The method of claim 1, wherein the migration barrier is a plate.

12. A migration barrier system comprising:
a first migration barrier comprising:

a first barrier wall including a bottom end and a top end; and a second barrier wall including a bottom end and a top end, the second barrier wall being connected to the first barrier wall at the top ends of the first and second barrier walls, the second barrier wall being angled relative to the first barrier wall such that the bottom ends of the first barrier wall and the second barrier wall together provide a base structure that supports the first migration barrier on a support surface in an upright, standing position; and a second migration barrier stacked on the first migration barrier forming a region of overlap, the second migration barrier comprising:

a first barrier wall including a bottom end and a top end; and a second barrier wall including a bottom end and a top end, the second barrier wall being connected to the first barrier wall at the top ends of the first and second barrier walls, the second barrier wall being angled relative to the first barrier wall such that the bottom ends of the first barrier wall and the second barrier wall together provide a base structure that supports the second migration barrier on a support surface;

wherein one or both of the first migration barrier and the second migration barrier is configured to allow for insertion of one or both of a food line and a water line therethrough;

wherein a plurality of bars of both of the first migration barrier and second migration barrier are spaced apart from each other along a length of the respective first barrier walls.

13. The migration barrier system of claim 12, wherein the plurality of bars of both of the first migration barrier and second migration barrier each have a first bar segment associated with the respective first barrier walls and a second bar segment associated with the respective second barrier walls.

14. The migration barrier system of claim 12, wherein the first migration barrier and the second migration barrier have a height of no more than 11 inches.

* * * * *